US012676925B2

(12) United States Patent
Whitten et al.

(10) Patent No.: US 12,676,925 B2
(45) Date of Patent: Jul. 7, 2026

(54) FOLDABLE RING STAND PHONE ACCESSORY

(71) Applicant: ROKFORM IP LLC, Irvine, CA (US)

(72) Inventors: Jeff Whitten, Irvine, CA (US); Jose Estuardo Chavarria, Arcata, CA (US)

(73) Assignee: ROKFORM IP LLC, Irvine, CA (US)

( * ) Notice: Subject to any disclaimer, the term of this patent is extended or adjusted under 35 U.S.C. 154(b) by 340 days.

(21) Appl. No.: 18/343,106

(22) Filed: Jun. 28, 2023

(65) Prior Publication Data

US 2024/0007557 A1 Jan. 4, 2024

Related U.S. Application Data

(60) Provisional application No. 63/367,530, filed on Jul. 1, 2022.

(51) Int. Cl.
H04M 1/04 (2006.01)
H04B 1/3877 (2015.01)

(52) U.S. Cl.
CPC ............ H04M 1/04 (2013.01); H04B 1/3877 (2013.01); H04M 2201/08 (2013.01)

(58) Field of Classification Search
None
See application file for complete search history.

(56) References Cited

U.S. PATENT DOCUMENTS

| | | | |
|---|---|---|---|
| 3,080,151 A | 3/1963 | Stig | |
| 3,080,634 A | 3/1963 | Lindblad | |
| 3,179,367 A | 4/1965 | Rapata | |
| 3,986,780 A | 10/1976 | Nivet | |
| 5,836,565 A | 11/1998 | Chang | |
| 6,305,588 B1 | 10/2001 | Michel | |
| 6,925,739 B1 | 8/2005 | Cole et al. | |
| 7,140,586 B2 | 11/2006 | Seil | |
| D564,754 S | 3/2008 | Tages et al. | |
| 7,374,142 B2 | 5/2008 | Carnevali | |
| 7,523,906 B2 | 4/2009 | Bennett | |
| D606,738 S | 12/2009 | Hofer et al. | |

(Continued)

FOREIGN PATENT DOCUMENTS

| | | |
|---|---|---|
| AU | 201817027 S | 1/2019 |
| AU | 201817028 S | 1/2019 |

(Continued)

OTHER PUBLICATIONS

International Search Report and Written Opinion re International Application No. PCT/US2013/021474 mailed on Apr. 2, 2013, in 12 pages.

(Continued)

*Primary Examiner* — Frantz Bataille
(74) *Attorney, Agent, or Firm* — VIA LLP

(57) ABSTRACT

A foldable ring assembly that can be coupled to a handheld electronic device or case is disclosed herein. The foldable ring assembly can include a mount and a support ring. The mount can be configured to be magnetically coupled to a handheld electronic device. The mount can include a first magnet, a second magnet, and a separator. The separator can be disposed between the first and second magnets. The support ring can be rotatably couped to the mount, wherein the support ring is configured to rotate between a closed position and an open position.

21 Claims, 6 Drawing Sheets

(56)  References Cited

U.S. PATENT DOCUMENTS

| | | | |
|---|---|---|---|
| 7,652,888 | B2 | 1/2010 | Bohlinger et al. |
| 7,685,904 | B2 | 3/2010 | Cutsforth |
| D627,771 | S | 11/2010 | Smith et al. |
| 7,930,006 | B2 | 4/2011 | Neu et al. |
| D646,672 | S | 10/2011 | Fathollahi |
| D647,085 | S | 10/2011 | Chung et al. |
| D653,190 | S | 1/2012 | Richter |
| D654,043 | S | 2/2012 | Pan et al. |
| D660,305 | S | 5/2012 | Ho |
| 8,167,127 | B2 | 5/2012 | Martin et al. |
| 8,172,247 | B2 | 5/2012 | Weber et al. |
| 8,267,418 | B1 | 9/2012 | Chuang |
| 8,317,067 | B2 | 11/2012 | Lewis |
| D671,932 | S | 12/2012 | Azoulay |
| 8,439,239 | B2 | 5/2013 | Lee |
| 8,469,245 | B2 | 6/2013 | Gregory et al. |
| D685,362 | S | 7/2013 | Murchison et al. |
| D685,363 | S | 7/2013 | Murchison et al. |
| D685,785 | S | 7/2013 | Seoc et al. |
| D687,004 | S | 7/2013 | Behling |
| 8,490,789 | B2 | 7/2013 | Lach et al. |
| D691,144 | S | 10/2013 | Peters |
| 8,544,644 | B2 | 10/2013 | Meehan |
| 8,616,508 | B1 | 12/2013 | Coleman |
| D697,060 | S | 1/2014 | Yang |
| 8,708,151 | B2 | 4/2014 | Whitten et al. |
| D711,886 | S | 8/2014 | Kerawala et al. |
| 8,800,763 | B2 | 8/2014 | Hale |
| 8,830,663 | B2 | 9/2014 | Child et al. |
| D718,290 | S | 11/2014 | Whitten et al. |
| 8,922,995 | B2 | 12/2014 | Su |
| 8,936,222 | B1 | 1/2015 | Bastian et al. |
| 8,950,715 | B2 | 2/2015 | Chiu |
| D725,119 | S | 3/2015 | Gaylord |
| D726,170 | S | 4/2015 | Ng |
| D726,732 | S | 4/2015 | Lay et al. |
| D739,857 | S | 9/2015 | Wilson et al. |
| 9,185,953 | B2 | 11/2015 | Whitten et al. |
| 9,243,739 | B2 | 1/2016 | Peters |
| 9,383,774 | B2 | 7/2016 | Whitten et al. |
| 9,402,016 | B1 | 7/2016 | Hidalgo |
| D766,225 | S | 9/2016 | Williams |
| 9,498,034 | B2 | 11/2016 | Whitten et al. |
| 9,592,871 | B2 | 3/2017 | Whitten et al. |
| 9,616,821 | B2 | 4/2017 | Elharar |
| 9,700,114 | B2 | 7/2017 | Whitten et al. |
| 9,723,910 | B2 | 8/2017 | Due |
| 9,772,064 | B2 | 9/2017 | Chen |
| D803,222 | S | 11/2017 | Cheng |
| 10,070,707 | B2 | 9/2018 | Whitten et al. |
| 10,093,377 | B2 | 10/2018 | Whitten et al. |
| 10,112,670 | B2 | 10/2018 | Whitten et al. |
| 10,122,400 | B2 | 11/2018 | Tiller et al. |
| D850,455 | S | 6/2019 | Cheng |
| 10,326,488 | B2 | 6/2019 | Wojcik |
| D852,681 | S | 7/2019 | Peters et al. |
| D855,048 | S | 7/2019 | Kim |
| 10,419,054 | B1 | 9/2019 | VanTassell |
| 10,420,407 | B2 | 9/2019 | Whitten et al. |
| D892,804 | S | 8/2020 | Lin |
| D904,386 | S | 12/2020 | Luo |
| 10,864,956 | B2 | 12/2020 | Whitten et al. |
| 11,044,974 | B2 | 6/2021 | Whitten et al. |
| D944,256 | S | 2/2022 | Cheng |
| D946,578 | S | 3/2022 | Cheng |
| 11,265,035 | B1 * | 3/2022 | Zhang ................. F16M 11/105 |
| D967,829 | S | 10/2022 | Lin |
| 11,552,667 | B2 | 1/2023 | Balderster |
| 2002/0139822 | A1 | 10/2002 | Infanti |
| 2004/0204169 | A1 | 10/2004 | Goradesky |
| 2006/0147080 | A1 | 7/2006 | Wilson et al. |
| 2006/0229740 | A1 | 10/2006 | Kreisel et al. |
| 2007/0014120 | A1 | 1/2007 | Kitamura |
| 2007/0174187 | A1 | 7/2007 | Altberg et al. |
| 2007/0212931 | A1 | 9/2007 | Livingston |
| 2007/0221694 | A1 | 9/2007 | Aguiliar |
| 2008/0023508 | A1 | 1/2008 | Harchol |
| 2008/0251512 | A1 | 10/2008 | Griffin et al. |
| 2008/0314941 | A1 | 12/2008 | Knych et al. |
| 2010/0084527 | A1 | 4/2010 | Lau et al. |
| 2011/0043086 | A1 | 2/2011 | Cui et al. |
| 2011/0143583 | A1 | 6/2011 | Zilmer et al. |
| 2011/0227735 | A1 | 9/2011 | Fawcett et al. |
| 2012/0298820 | A1 | 11/2012 | Manolidis |
| 2013/0142371 | A1 | 6/2013 | Martin et al. |
| 2013/0277530 | A1 | 10/2013 | Wong |
| 2013/0292270 | A1 | 11/2013 | Lach et al. |
| 2013/0292296 | A1 | 11/2013 | Kang et al. |
| 2014/0034521 | A1 | 2/2014 | Liu |
| 2014/0287800 | A1 | 9/2014 | Ho |
| 2014/0355200 | A1 | 12/2014 | Thiers |
| 2015/0189963 | A1 | 7/2015 | Lai et al. |
| 2015/0201723 | A1 | 7/2015 | Rayner et al. |
| 2016/0192752 | A1 | 7/2016 | Lach et al. |
| 2018/0359346 | A1 | 12/2018 | Chen |
| 2019/0208046 | A1 | 7/2019 | Gluck |
| 2020/0326030 | A1 | 10/2020 | Surai |
| 2020/0329133 | A1 * | 10/2020 | Surani ..................... H04M 1/04 |
| 2021/0188380 | A1 | 6/2021 | Whitten et al. |
| 2021/0215327 | A1 | 7/2021 | Grandadam |
| 2021/0227960 | A1 | 7/2021 | Carnevali |
| 2021/0261215 | A1 | 8/2021 | Whitten et al. |
| 2021/0315340 | A1 | 10/2021 | Whitten et al. |
| 2022/0117384 | A1 | 4/2022 | Whitten |
| 2023/0167940 | A1 | 6/2023 | Lin |

FOREIGN PATENT DOCUMENTS

| | | | |
|---|---|---|---|
| AU | 201817029 | S | 1/2019 |
| CN | 303239699 | S | 6/2015 |
| CN | 204785421 | U | 11/2015 |
| DE | 20 2004 017 041 | U1 | 3/2005 |
| EP | 005832789 | | 1/2019 |
| EP | 005832813 | | 1/2019 |
| EP | 005832854 | | 3/2019 |
| WO | WO 2013/106849 | | 7/2013 |

OTHER PUBLICATIONS

Affidavit of Christopher Buttler dated Nov. 18, 2017 and Exhibits Welcome to iBikeMount.com—The Bike Mount Solution for iPho . . . , https://web.archive.org/web/20090721175904/http://www.ibikemount.com:80/index.html, in 20 pages.

Bicio—GoRide—Bike Mount for iPhone 3G/3GS, http://www.bicio.com/GoRide_iphoneBikeMount.php, accessed via web archive, dated Nov. 29, 2011.

Bicio—GoRide Product page depicting an iPhone Bike Mount and Base Mount, http://www.bicio.com/category-bike.php, accessed via web archive, dated Dec. 8, 2011.

Bicio—GoRide iPhone Bike Mount, http://www.bicio.com/GoRide_iphoneBase.php, accessed via web archive, dated Apr. 16, 2011.

Donovan, Thomas J., Letter to counsel for Applicant, Dec. 8, 2017.

Donovan, Thomas J., Letter to counsel for Applicant, dated Mar. 15, 2018, and accompanying exhibits to letter.

"The Wallee Wall Mount + Hard Case System for iPad", The Gadgeteer (Jul. 29, 2010), available at http://the-gadgeteer.com/2010/07/29/the-wallee-wall-mount-hard-case-system-for-ipad/.

The Wallee iPad Case and Wall Mount, https://web.archive.org/web/20110108191535/http://thewallee.com/#, in 89 pages.

The Wallee—Features page depicting iPad hard case and wall plate, http://thewallee.com/site/about ("features" tab), accessed via web archive, dated Jan. 8, 2011.

The Wallee—Technical Specifications page depicting iPad hard case and wall plate, http://thewallee.com/site/about ("tech specs" tab), accessed via web archive, dated Jan. 8, 2011.

* cited by examiner

FOLDABLE RING STAND PHONE ACCESSORY

RELATED APPLICATION AND INCORPORATION BY REFERENCE

This application claims the benefit under 35 U.S.C. § 119(e) as a non-provisional application of U.S. Prov. Appl. No. 63/367,530, filed on Jul. 1, 2022, which is hereby incorporated by reference in its entirety. Any and all applications for which a foreign or domestic priority claim is identified in the Application Data Sheet as filed with the present application are hereby incorporated by reference herein and made a part of the present disclosure.

BACKGROUND

Field

The disclosure relates to mounting arrangements for electronic devices, in particular foldable ring stand accessories.

Description of the Related Art

Handheld and/or portable electronic devices (e.g., smartphones, tablet computers, handheld readers, portable speakers and similar devices) are important and common tools. These tools are constantly in use, both at home and on the go.

With this frequency and variety of use comes the need or desirability for mounting or supporting the electronic device relative to another object. While certain mounting and/or supporting arrangements exist, there remains a need for improved arrangements that permit easier and/or more securing mounting and/or supporting, or at least provides the public with a useful choice.

SUMMARY

An aspect of a disclosed embodiment involves a foldable ring stand assembly including a mount and a support ring. The mount has a first surface and a second surface. the first surface of the mount is configured to be magnetically coupled to a handheld electronic device. The mount includes a first magnet positioned closer to the first surface of the mount, a second magnet positioned closer to the second surface of the mount, and a central magnet positioned at or near a center of the mount. The support ring is rotatably coupled to the mount and configured to rotate between a closed position and an open position.

In some embodiments, the first magnet and the second magnet are separated by a plastic component. In some embodiments, the first magnet and the second magnet are ring shaped. In some embodiments, the first magnet has a polarity that is different than a polarity of the second magnet. In some embodiments, the mount is magnetically coupled directly to a surface of the handheld electronic device. In some embodiments, the mount is magnetically coupled to a protection system or case of the handheld electronic device.

Another aspect of a disclosed embodiment involves a foldable ring stand assembly including a mount and a support ring. The mount is configured to be magnetically coupled to a handheld electronic device. The mount includes a first magnet, a second magnet, and a plastic component disposed between the first and second magnets. The support ring is rotatably coupled to the mount and is configured to rotate between a closed position and an open position.

In some embodiments, the foldable ring stand assembly further includes a central magnet positioned at or near a center of the mount. In some embodiments, the mount is magnetically coupled directly to a surface of the handheld electronic device. In some embodiments, the mount is magnetically coupled to a protection system or case of the handheld electronic device. In some embodiments, the first magnet has a polarity that is different than a polarity of the second magnet. In some embodiments, when in the open position, the support ring is configured to support the handheld electronic device.

Another aspect of a disclosed embodiment involves a foldable ring stand assembly including a mount and a support ring. The mount is configured to be magnetically coupled to a handheld electronic device. The mount includes a first magnet, a second magnet, a plastic component disposed between the first and second magnets, and a central magnet positioned at or near a center of the mount. The support ring is rotatably coupled to the mount and surrounding the central magnet. The support ring is configured to rotate between a closed position and an open position.

In some embodiments, the first magnet and the second magnet are ring shaped. In some embodiments, the mount is magnetically coupled directly to a surface of the handheld electronic device. In some embodiments, the mount is magnetically coupled to a protection system or case of the handheld electronic device. In some embodiments, the first magnet has a polarity that is different than a polarity of the second magnet. In some embodiments, when in the open position, the support ring is configured to support the handheld electronic device.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not considered limiting of its scope, the disclosure will be described with additional specificity and detail through the use of the accompanying drawings.

DETAILED DESCRIPTION

Embodiments of systems, components and methods of assembly and manufacture will now be described with reference to the accompanying figures, wherein like numerals can refer to like or similar elements throughout. Although several embodiments, examples and illustrations are disclosed below, it will be understood by those of ordinary skill in the art that the inventions described herein extends beyond the specifically disclosed embodiments, examples, and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions described herein.

FIGS. 1-6 illustrate example embodiments of a foldable ring stand for a handheld and/or portable electronic device. The illustrated foldable ring stand is also suitable for use, or could be modified for use, with other handheld or similarly-sized objects. As used herein, handheld and/or portable electronic devices include, but are not limited to, smartphones, tablet computers, handheld readers, portable speakers and similar devices.

In at least some embodiments disclosed herein, the foldable ring stand arrangements can be implemented in the context of a protection system or case for a portable or handheld electronic device (hereinafter "handheld electronic device"). Some embodiments include a removable foldable ring stand assembly that is configured to attach to a case that incorporates a magnetic attachment region. Some embodiments include a removable foldable ring stand assembly that is configured to directly magnetically attach to a handheld electronic device. In yet other embodiments, the foldable ring stand could be configured for interlocking or other non-magnetic connection with a case or other object.

Figure 1:
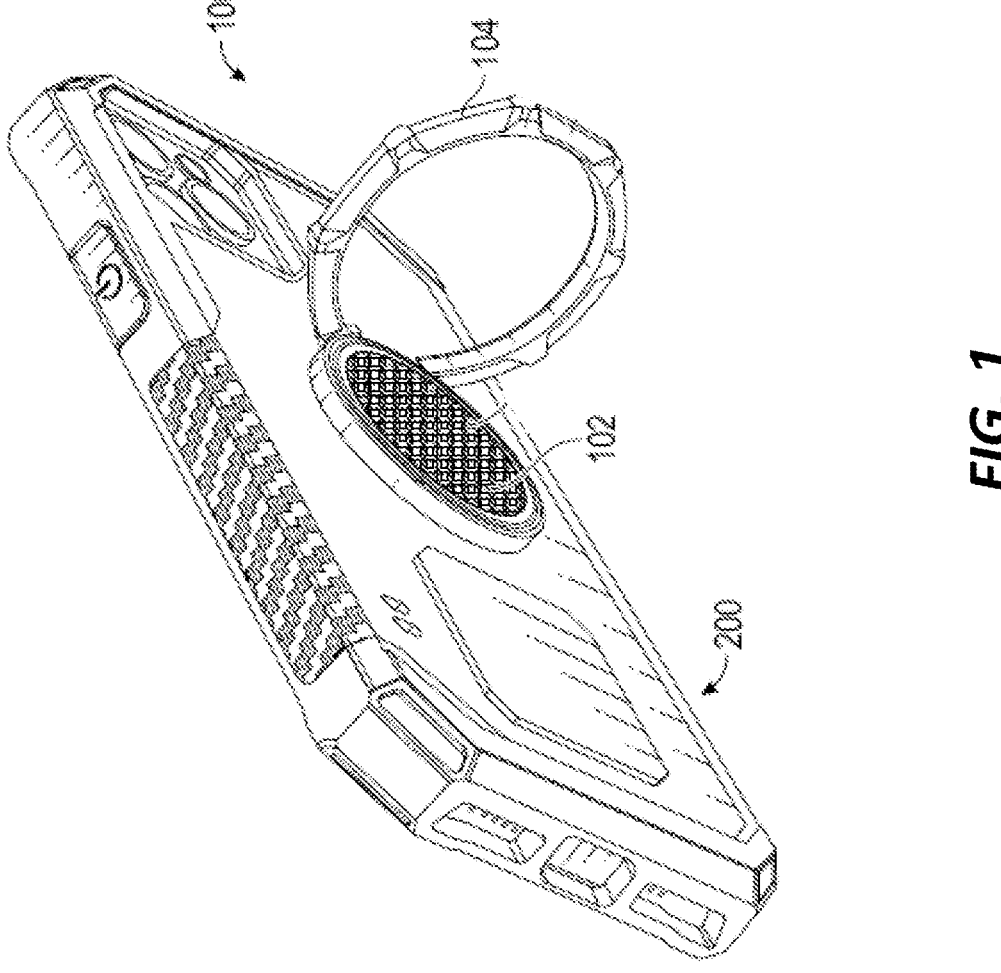
FIG. 1 illustrates an example embodiment of a foldable ring stand attached to a case for a handheld electronic device or similar objects.
Figure 2:
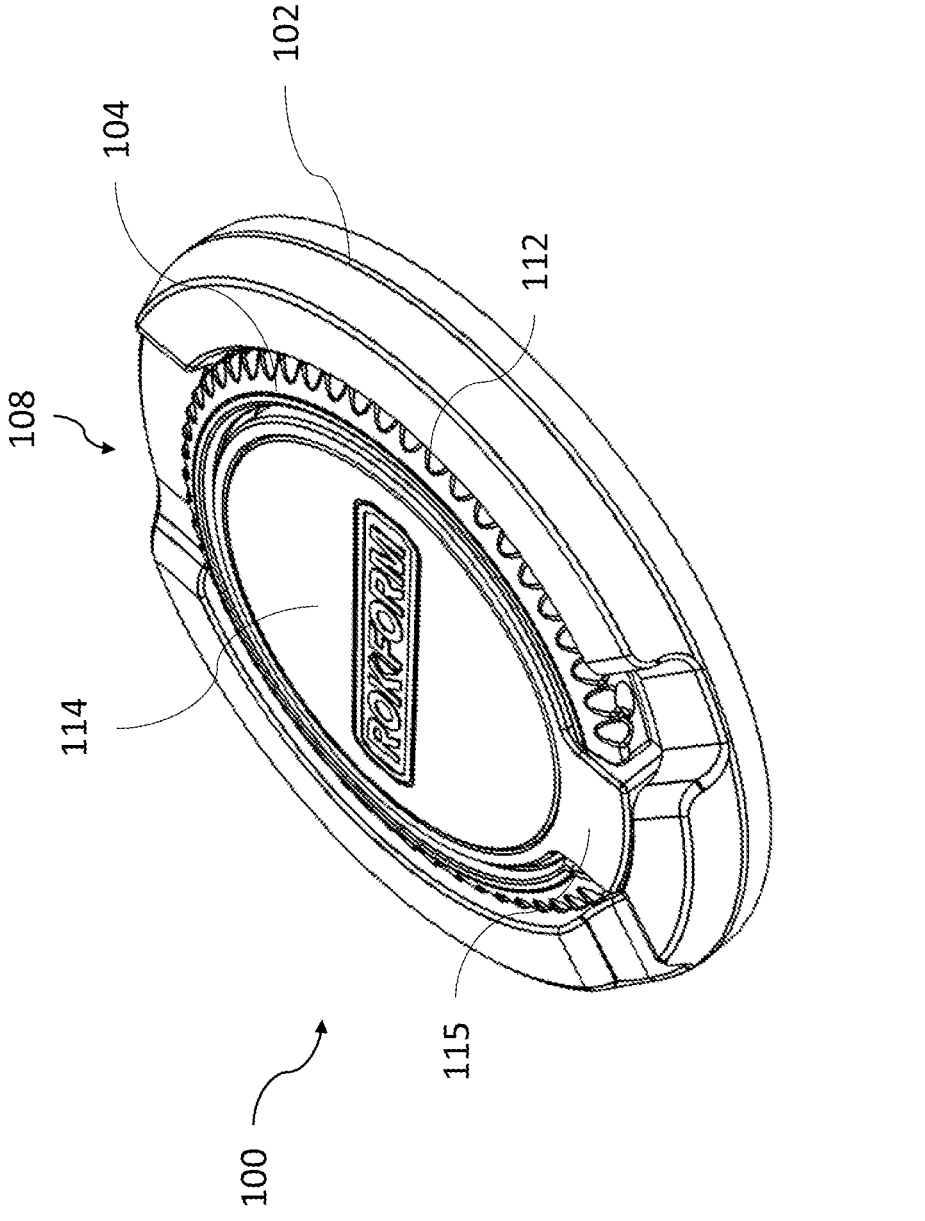
FIG. 2 is a perspective view of an example embodiment of a foldable ring stand.

FIG. 1 illustrates an example embodiment of a foldable ring stand 100 magnetically attached to a case 200 for a handheld electronic device or similar object. While the foldable ring stand 100 is depicted as attached to a case 200, the foldable ring stand 100 can also be magnetically attached directly to the handheld electronic device. The foldable ring stand 100 can include a first or mount portion or a mount 102 and a second or ring portion or a support ring 104. The support ring 104 can be rotatably connected to the mount 102. The support ring 104 can transition between an open position and a closed position. For example, an open position is shown in FIG. 1, while a closed position is shown in FIG. 2. In some configurations, the support ring 104 can assume intermediate positions between the open position and the closed position. In some configurations, the support ring 104 can be infinitely adjustable between the open position and the closed position.

The support ring 104 can be configured to support the handheld electronic device. For example, the support ring 104 can support the handheld electronic device in an upright position, such that the handheld electronic device is resting upright on a surface. This can allow for hands free viewing of the handheld electronic device. As used herein, upright means a position in which the handheld electronic device is supported at an angle relative to a surface upon which the handheld electronic device rests. The support ring 104 can support the handheld electronic device when the support ring 104 is held by a user. For example, the user can grip the support ring 104 be inserting one or more fingers through the opening to securely hold the handheld electronic device.

Figure 3:
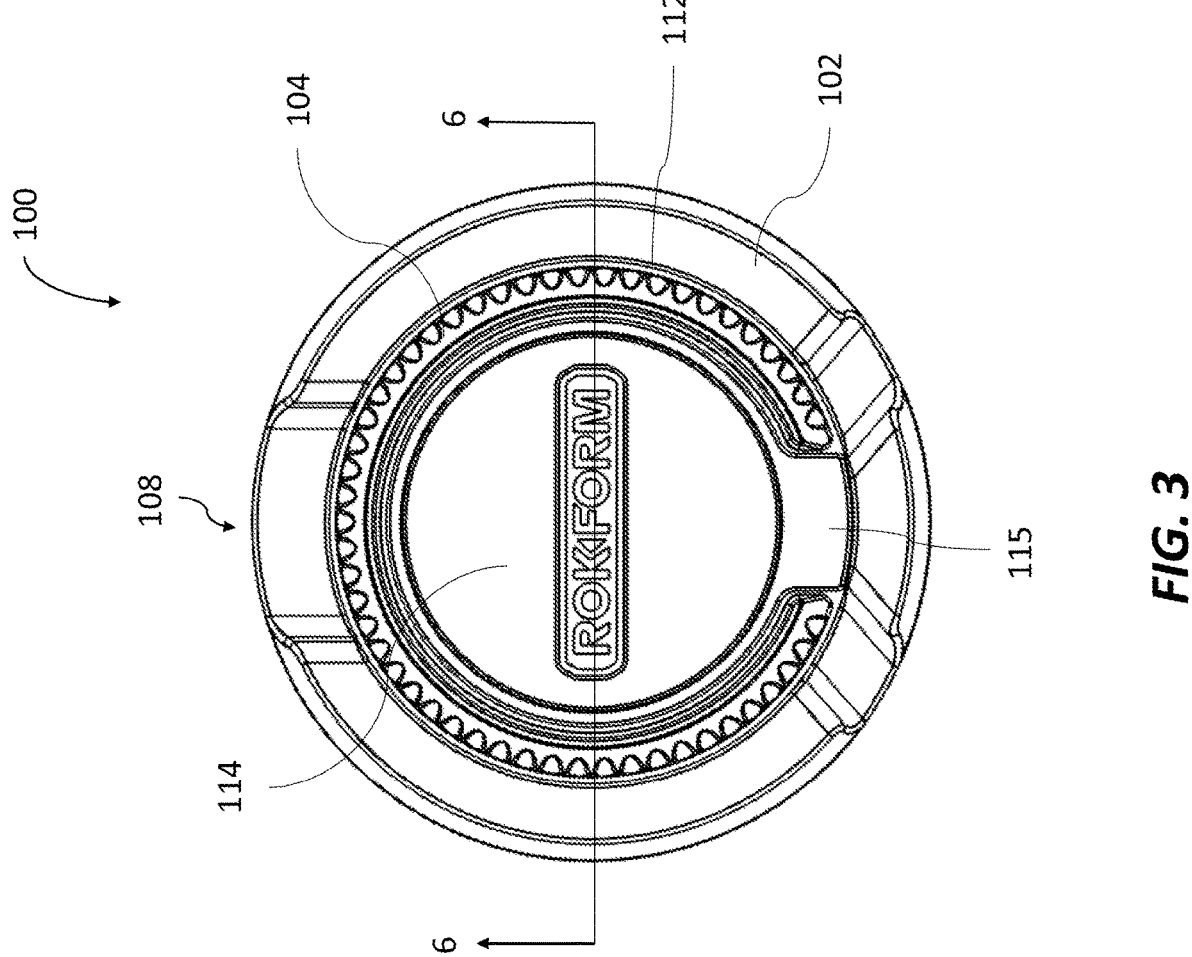
FIG. 3 is a top view of the foldable ring stand of FIG. 2.

FIGS. 2 and 3 illustrate the foldable ring stand 100 separate from the handheld electronic device and case 200. The foldable ring stand 100 can include the mount 102 and the support ring 104. The mount 102 can be circular in shape. In some variants, the mount 102 can be oval, polygonal (e.g., pentagon, hexagon, heptagon, octagon, nonagon, or decagon), irregular, and/or other shapes. The support ring 104 can be circular in shape. In some variants, the support ring 104 can be oval, polygonal (e.g., pentagon, hexagon, heptagon, octagon, nonagon, or decagon), irregular, and/or other (e.g., annular) shapes. The support ring 104 can correspond in shape to the mount 102. In some variants, the support ring 104 can be different in shape as compared to the mount 102. In some embodiments, the mount 102 and/or the support 104 can be a carbon reinforced nylon. The use of a carbon reinforced nylon can reduce the overall weight of the foldable ring stand 100.

The mount 102 can include a recessed area 108. The recessed area 108 can have a width that is less than the widest width of the mount 102. The recessed area 108 can be positioned along the outer periphery of the mount 102. The recessed area 108 can be positioned opposite a location where the support ring 104 is coupled to the mount 102. The recessed area 108 can be configured to assist a user in moving the support ring 104 from a closed position to an open position. For example, the recessed area 108 can allow a user to access and/or lift the support ring 104 from a side or bottom surface of the support ring 104 to rotate the support ring 104 away from the mount 102.

The mount 102 can include a concave area 110 (shown in FIG. 6) configured to retain the support ring 104 in a closed position. The concave area 110 can be shaped to receive the support ring 104, and as such can complement or mirror the shape of the support ring 104. In some embodiments, the concave area 110 can be defined by an inner diameter 112 of the mount 102 and an outer diameter of a central portion 114, as discussed in more detail below. The concave area 110 can be recessed a depth equal to a depth of the recessed area 108. The concave area 110 can be recessed a depth different than the depth of the recessed area 108. In the illustrated arrangement, the depth of the concave area 110 is greater than the depth of the recessed area 108.

Figure 4:
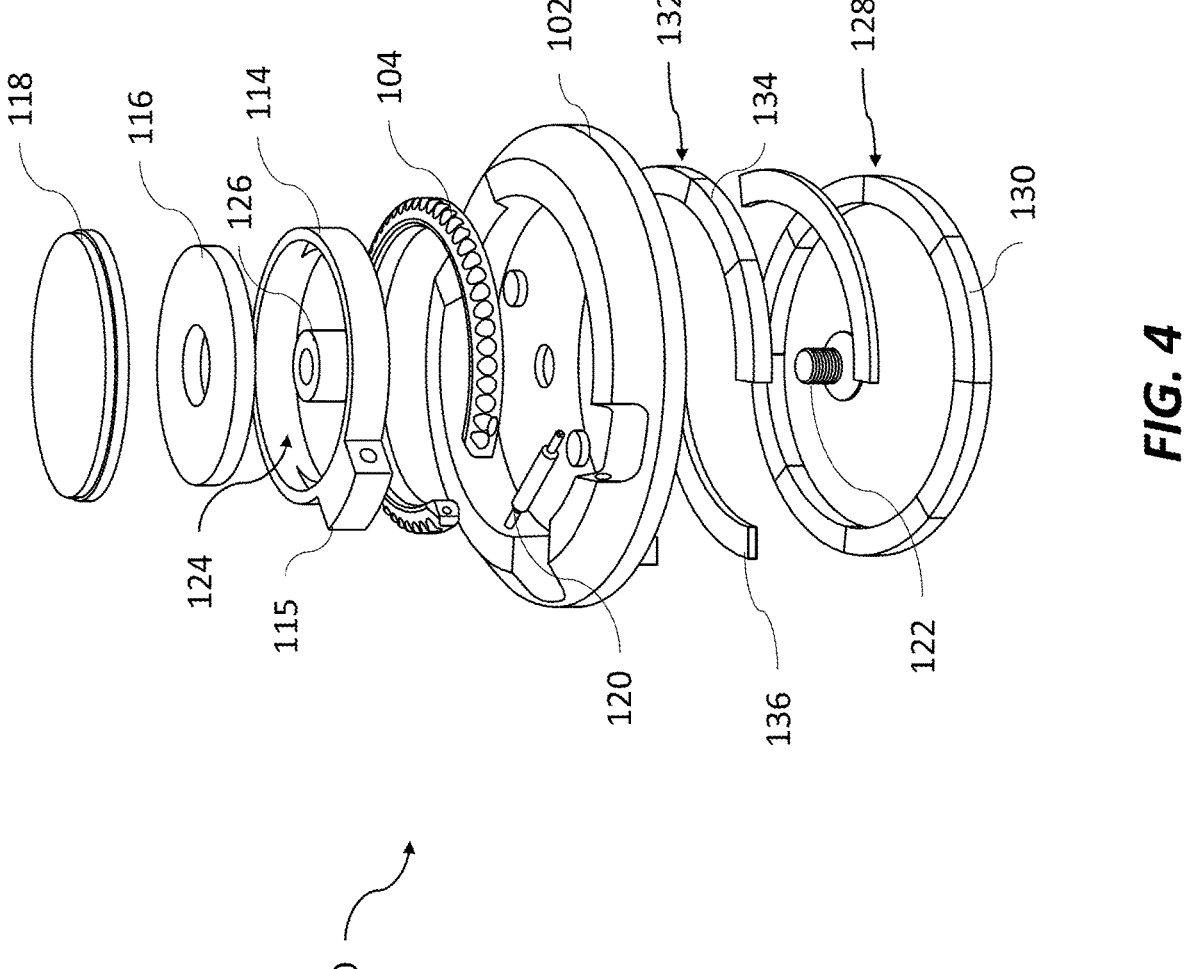
FIG. 4 is an exploded view of the foldable ring stand of FIG. 2.

FIG. 4 is an exploded view of the foldable ring stand 100. As described above, the foldable ring stand 100 can include the mount 102 and the support ring 104. The support ring 104 can be rotatably connected to the mount 102. The foldable ring stand 100 can include the central portion 114 positioned within an opening of the support ring 104. The central portion 114 can be sized and shaped to complement or correspond to the shape of the opening of the support ring 104. The central portion 114 can be fixed to the mount via a screw 122. In some variants, the central portion 114 can be integrally formed with the mount 102. In some variants, the central portion 114 can be formed separate from the mount 102.

The central portion 114 can comprise a connecting portion 115 configured to receive a pin 120. The connecting portion 115 can comprise a through hole that is configured to receive the pin 120. The pin 120 can extend through the connecting portion 115 and into a first opening of the support ring 104 at a first end of the pin 120 and into a second opening of the support ring 104 at a second end of the pin 120. The pin 120 is configured to allow the support ring 104 to rotate relative to the mount 102 between open and closed positions. The central portion 114 can remain fixed (e.g., relative to the mount 102) while the support ring 104 rotates.

The central portion 114 can comprise a space 124 configured to receive a central magnet 116. The central magnet 116 can have an annular or ring shape with a central opening configured to rest around a protrusion 126 of the central portion 114. In some variants, the central magnet 116 can be solid (e.g., circular) without a central opening. The central magnet 116 can have a shape that complements or corresponds to the shape of the central portion 114. The foldable ring stand 100 can include cover 118. The cover 118 can be configured to enclose the central magnet 116 within the central portion 114. The cover 118 can be configured to lock in place within the space 124. The edges of the cover 118 can engage with the inner wall of the space 124. The cover 118 can be constructed from or comprise a non-slip or grip material, such as a rubber, a thermoplastic elastomer (TPE) (e.g., thermoplastic polyurethane (TPU)), or another similar material. The central magnet 116 can be configured to magnetically connect the foldable ring stand 100 to a surface different than the surface of a handheld electronic device.

Figure 5:
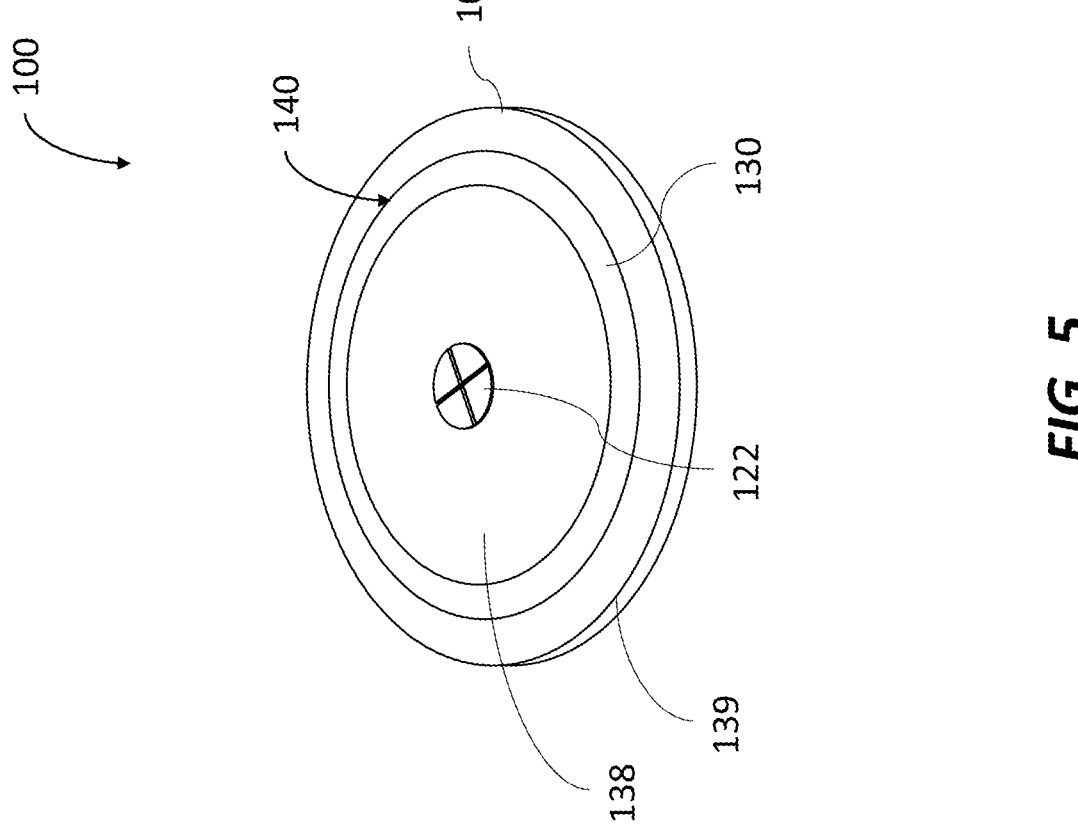
FIG. 5 is a bottom view of the foldable ring stand of FIG. 2.
Figure 6:
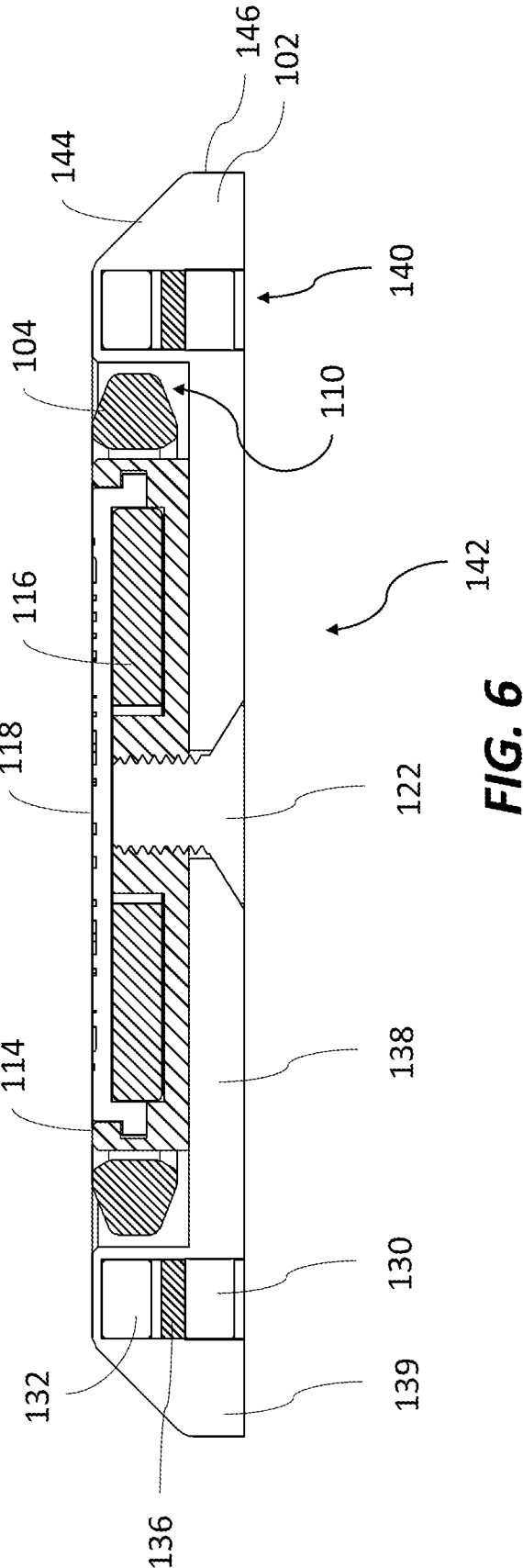
FIG. 6 is a cross-section of the foldable ring stand of FIG. 2.

With reference to FIGS. 4-6, the foldable ring stand 100 can have a first magnet 128 disposed within the mount 102. The first magnet 128 can have a ring shape. The first magnet 128 can have a partial ring shape (not form a complete circle). The first magnet 128 can have a shape that corresponds to the shape of the mount 102. The first magnet 128 can be a singular piece. The first magnet 128 can be formed by a plurality of sections 130. The first magnet 128 can be positioned closer to a surface of the mount 102 that is configured to attached to a handheld electronic device.

The foldable ring stand 100 can have a second magnet 132 disposed within the mount 102. The second magnet 132 can have a ring shape. The second magnet 132 can have a partial ring shape (not form a complete circle). The second magnet 132 can have a shape that corresponds to the shape of the mount 102. The second magnet 132 can be a singular piece. The second magnet 132 can be formed by a plurality of sections 134. The second magnet 132 can be positioned closer to a surface of the mount 102 that is configured to face away from a handheld electronic device.

The first and second magnets 130, 132 can have different polarities. The first magnet 130 can have a polarity or pole opposite the second magnet 132. In some configurations, the first and second magnets 130, 132 can be MAGSAFE® compatible magnets. The first and second magnets 130, 132 can be configured to magnetically attach to any MAGSAFE® compatible handheld electronic device. The first magnet 130 can have a polarity or pole that is opposite the polarity of the polarity or pole of a handheld electronic device.

The first and second magnets 130, 132 can be separated by a separator 136. In some embodiments, the separator 136 may be a plastic component. The separator 136 can correspond in shape to the first and second magnets 130, 132. The separator 136 can be annular or ring shaped. In some embodiments, the separator 136 can be one or more curved members that generally correspond to a curvature of a portion of the first and second magnets 130, 132. For example, the separator 136 may not form a complete ring shape, as shown in FIG. 4. In some embodiments, the separator 136 may comprise two members are the positioned opposite one another and in between the first and second magnets 130, 132. In some embodiments, the separator 136 may comprise a plurality of members that are circumferentially spaced between the first and second magnets, 130, 132.

FIG. 5 illustrates a bottom view of the foldable ring stand 100. As shown, the first magnet 130 can be exposed or visible from the bottom of the foldable ring stand 100. The first magnet 130 can be positioned within a recessed area 140. The second magnet 132 and separator 136 can also be positioned within the recessed area 140. The recessed area 140 can be defined by an inner portion 138 of the mount 102 and an outer portion 139. The recessed area 140 can be determined by an inner diameter of the outer portion 139 and an outer diameter of the inner portion 138. The size and shape of the recessed area 140 can be configured to retain the first and second magnets 130, 132 and the separator 136 in place. In some embodiments, the first and second magnets

130, 132 and the separator 136 can be mechanically fixed in place. In some embodiments, the first magnet 130 can be mechanically fixed in place, which in turn can assist in retaining the second magnet 132 and the plastic component within the recessed area 140. In some variants, the mount 102 can include a cap or cover (not shown) configured to cover the bottom surface of the mount 102. Other suitable methods or mechanisms for retaining the magnets 130, 132 and separator 136 in place can also be used, such as adhesives or over-molding/co-molding processes or structures.

With reference to FIG. 6, the foldable ring stand 100 can have a flat or planar bottom surface 142. The bottom surface 142 being flat or planar can improve the magnetic connection between the foldable ring stand 100 and the handheld electronic device. The foldable ring stand 100 can have a side wall having an angled portion 144 and a vertical portion 146. The vertical portion 146 can be vertical relative the bottom surface 142. The foldable ring stand 100 can have tapered edges.

As described herein, the foldable ring stand 100 offers many benefits including the ability to magnetically connect to any compatible handheld electronic device. A separate corresponding case is not needed as the foldable ring stand 100 can magnetically connect directly to the handheld electronic device. Therefore, a user does not need a case and a mount in order to gain the benefits provided by the foldable ring stand 100. Instead a user can simply use the foldable ring stand 100 without the need for any extra parts. While a separate case is not needed, the foldable ring stand 100 is also capable of magnetically connecting to any case with a corresponding magnet. Further, the foldable ring stand 100 is capable of magnetically connected to a surface other than a surface of a handheld electronic device. This can be beneficial when a user wants to mount the handheld electronic device to a magnetic surface.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A foldable ring assembly comprising:
a mount having a first surface and a second surface, the first surface of the mount configured to be magnetically coupled to a handheld electronic device and the second surface is parallel to the first surface and facing away from the handheld electronic device, the mount comprising:
a first magnet positioned closer to the first surface of the mount,
a central magnet positioned at or near a center of the mount and positioned closer to the second surface,
a non-slip cover that covers the central magnet and forms at least a portion of the second surface of the mount, and
a support ring rotatably coupled to the mount, wherein the support ring is configured to rotate between a closed position and an open position and wherein the support ring surrounds the central magnet in the closed position.

2. The foldable ring assembly of claim 1, further comprising a second magnet, wherein the first magnet and the second magnet are separated by a plastic component.

3. The foldable ring assembly of claim 1, wherein the first magnet is ring shaped.

4. The foldable ring assembly of claim 2, wherein the first magnet has a polarity that is different than a polarity of the second magnet.

5. The foldable ring assembly of claim 1, wherein the mount is magnetically coupled directly to a surface of the handheld electronic device.

6. The foldable ring assembly of claim 1, wherein the mount is magnetically coupled to a protection system or case of the handheld electronic device.

7. The foldable ring assembly of claim 2, wherein the first magnet and the second magnet are MAGSAFE magnets.

8. The foldable ring assembly of claim 1, wherein when in the open position, the support ring is configured to support the handheld electronic device.

9. A foldable ring assembly comprising:
a mount configured to be magnetically coupled to a handheld electronic device, the mount comprising:
a first axial end surface configured to be nearest the hand held electronic device when the foldable ring assembly is magnetically coupled to the handheld electronic device and a second axial end surface located furthest from the handheld electronic device when the foldable ring assembly is magnetically coupled to the handheld electronic device,
a first magnet located nearer to the first axial end surface and between the first axial end surface and the second axial end surface,
a second magnet located nearer to the second axial end surface and between the first axial end surface and the second axial end surface,
a central magnet positioned at or near the center of the mount and located between the first axial end surface and the second axial end surface, and
a plastic component disposed between the first magnet and the second magnet, and
a support ring rotatably coupled to the mount, wherein the support ring is configured to rotate around a pin between a closed position and an open position and wherein the support ring surrounds the central magnet in the closed position.

10. The foldable ring assembly of claim 9, wherein the mount is magnetically coupled directly to a surface of the handheld electronic device.

11. The foldable ring assembly of claim 9, wherein the mount is magnetically coupled to a protection system or case of the handheld electronic device.

12. The foldable ring assembly of claim 9, wherein the first magnet has a polarity that is different than a polarity of the second magnet.

13. The foldable ring assembly of claim 9, wherein when in the open position, the support ring is configured to support the handheld electronic device.

14. A foldable ring assembly comprising:
a mount configured to be magnetically coupled to a handheld electronic device, the mount comprising:
a first magnet,
a second magnet,
a plastic component disposed between the first magnet and the second magnet, and a central magnet positioned at or near a center of the mount, and a support ring rotatably coupled to the mount and surrounding the central magnet, wherein the support ring is configured to rotate between a closed position and an open position.

15. The foldable ring assembly of claim 14, wherein the first magnet and the second magnet are ring shaped.

16. The foldable ring assembly of claim 14, wherein the mount is magnetically coupled directly to a surface of the handheld electronic device.

17. The foldable ring assembly of claim 14, wherein the mount is magnetically coupled to a protection system or case of the handheld electronic device.

18. The foldable ring assembly of claim 14, wherein the first magnet has a polarity that is different than a polarity of the second magnet.

19. The foldable ring assembly of claim 14, wherein when in the open position, the support ring is configured to support the handheld electronic device.

20. The foldable ring assembly of claim 9, wherein the central magnet is annular in shape.

21. The foldable ring assembly of claim 9, wherein each of the first magnet and the second magnet are annular in shape with an internal diameter and the central magnet is annular in shape with an outer diameter that is smaller than the inner diameter, and wherein the first magnet, the second magnet, and the central magnet are positioned concentrically with respect to one another.

\*  \*  \*  \*  \*